United States Patent [19]
Held et al.

[11] Patent Number: 5,447,019
[45] Date of Patent: Sep. 5, 1995

[54] MOBILE GARDEN APPLIANCE WITH MOTOR DRIVE FOR TOOL AND WHEELS

[75] Inventors: Peter Held, Scheuerfeld; Bernhard Le Bihan, Katzwinkel, both of Germany

[73] Assignee: Wolf-Gerate GmbH, Germany

[21] Appl. No.: 89,742

[22] Filed: Jul. 9, 1993

[30] Foreign Application Priority Data

Jul. 9, 1992 [DE] Germany .............. 42 22 578.7

[51] Int. Cl.6 .................................... A01D 34/76
[52] U.S. Cl. .................. 56/10.2 G; 56/DIG. 4; 56/DIG. 6
[58] Field of Search ............ 56/16.9, 10.2 G, 10.2 H, 56/16.7, DIG. 4, DIG. 6

[56] References Cited

U.S. PATENT DOCUMENTS

| | | | |
|---|---|---|---|
| 4,078,442 | 3/1978 | Bendall | 74/230.17 |
| 4,169,392 | 10/1979 | McDonald | 56/DIG. 4 X |
| 5,191,755 | 3/1993 | Gryspeerdt | 56/DIG. 6 X |

FOREIGN PATENT DOCUMENTS

| | | |
|---|---|---|
| 135702 | of 1985 | European Pat. Off. . |
| 0763952 | of 1962 | Germany . |
| 1847211 | 2/1962 | Germany . |
| 2539094 | of 1977 | Germany . |
| 0685183 | 9/1979 | U.S.S.R. ............ 56/10.2 H |

*Primary Examiner*—Terry Lee Melius
*Attorney, Agent, or Firm*—Ostrolenk, Faber, Gerb & Soffen

[57] ABSTRACT

In a garden appliance provided with a traveling drive, the tools, for example a mowing tool, are driven by a motor which is also coupled to the drive wheels. Connected between the motor and drive wheels is a gear which reduces the speed of the drive wheels with increasing output requirement or increasing torque, and vice versa. As a result, it is, for example, effected that in the case of a high resistance to mowing the advance of the mower is less than in the case of a low resistance to mowing. A V-belt pulley gear with variable radii can be used as the gear, the axial adjustment of the V-belt pulley halves being effected as a function of the load torque. This setting can be performed against the action of return springs via helical threads which can be constructed, for example, in the form of a ball self-closure.

10 Claims, 7 Drawing Sheets

MOBILE GARDEN APPLIANCE WITH MOTOR DRIVE FOR TOOL AND WHEELS

The invention relates to a mobile garden appliance with a motor for driving the tools and the wheels. Such garden appliances are widely found, for example, as hand-guided or else self-propelled lawn mowers. Even in the case of the hand-guided lawn mowers, the possibility preponderantly exists of setting the driving speed. It is also known to set the driving speed via stepless variable gears, it being necessary for the operator to select the transmission ratio in each case.

It is known that it is advantageous for the result of cutting and collecting during lawn mowing if the lawn mower is moved more slowly in the case of thick grass growth than in the case of less densely grown lawn surfaces. However, it is difficult for the operator to judge which speed of advance is favorable for the particular mowing situation, with the result that work has frequently been done at too high a speed of advance, which could lead to stoppage of the motor, or at least to a poor result of cutting and collecting.

It is the object of the invention to provide a garden appliance with a traveling drive, which is capable of automatically setting the most favorable relationship between the cutting operation and the speed of advance.

The invention can be applied to the most varied types of garden appliances, or else to agricultural appliances, the drive being able to be performed either by an internal combustion engine or by an electric motor.

Consequently, the invention is based on the finding that it is possible to utilize the automatic speed setting by reaction forces of the torque introduced for driving the tools.

The invention can be applied in conjunction with the conventional standard control for electric motors or internal combustion engines. These drive motors have the property that the speed in the loaded state is lower than the speed in the idling range. This speed reduction in the loaded range leads, for example when a lawn mower has a high grass output, to a reduction in the circumferential speed of the cutter, which worsens the result of cutting and collecting. This effect can be compensated according to the invention by reducing the driving speed of the mower additionally by a certain amount by means of the automatic speed control via the reduction which is produced by the drop in speed in the loaded range.

However, the invention can also be used advantageously in conjunction with power-matched control such as proposed in German Offenlegungsschrift 4,201,151, that is to say the present invention for controlling the driving speed can be combined with a device in which the drive speed is set to a predetermined value as a function of the load occurring at the tools. Such regulation or control increases the motor speed with increasing load in order to improve the result of cutting and collecting in the case of a high grass output. However, when the control or regulation in accordance with the above-mentioned proposal is used in conjunction with a traveling drive, there is also an increase in the driving speed in a manner analogous to the increase in speed of the drive motor, which is undesired in the loaded case. By combination with the present invention, the increase in speed of the drive motor can be compensated with the automatic speed control in such a way that the mower always operates at a constant drive speed or moves somewhat more slowly in the loaded mode.

The above-mentioned advantages can be achieved not only with lawn mowers but also with numerous other garden appliances, for example verticutors or else harvesters.

For the purpose of automatically setting the driving speed as a function of the load, it is expedient to apply a stepless gear. For reasons of simplicity of design and for reasons of cost, it is expedient in this case to use a variable gear with V-belt pulleys whose active diameter can be varied by axial spreading of the belt pulley halves. Such a variable belt pulley can be seated on the drive shaft of the motor and adjusted as a function of the load, while a drive belt is guided after a further belt pulley which is connected directly or via an gear to the drive wheels.

Advantageous embodiments of the invention follow from the subclaims.

Exemplary embodiments of the invention are described below with the aid of the drawing, in which FIG. 1 shows a diagrammatic side view of a lawn mower with a vertical rotor shaft for driving a cutter bar and a wheel drive;

Figure 1:
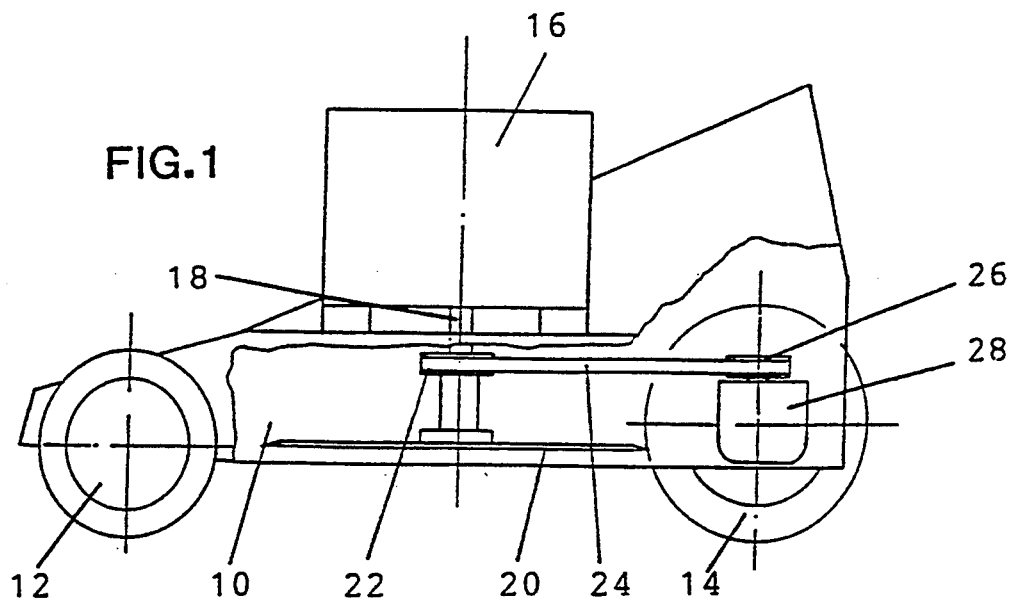

The lawn mower represented in FIG. 1 as an exemplary embodiment has a chassis 10 with running wheels 12 and drive wheels 14. The chassis carries a motor 16 which can be designed as an internal combustion engine or as an electric motor. The rotor drive shaft 18 of the motor 16 is vertical and carries at the lower end a horizontally revolving cutter bar 20. Seated on the drive shaft 18 is a V-belt pulley 22 of variable diameter which is connected via a V-belt 24 to a V-belt pulley 26. The V-belt pulley 26 is seated on the drive shaft of a gear 28 whose output shafts drive the drive wheels 14.

As described in detail further below, the arrangement is made such that with increase in the load acting on the cutter bar 20 the V-belt pulley 22 is spread and transfers to a smaller diameter, with the result that the speed at which the drive wheels 14 are driven drops. Inversely, the active diameter of the belt pulley 22 increases with decreasing load, as a result of which the driving speed is increased. It becomes possible thereby to match the traveling drive speed for a lawn mower or other garden appliances automatically to the particular loaded state.

The principle of automatic speed setting is based on utilizing reaction forces of the torque introduced for driving the garden appliance for the purpose of adjusting the V-belt pulley or another drive member.

Figure 4A:
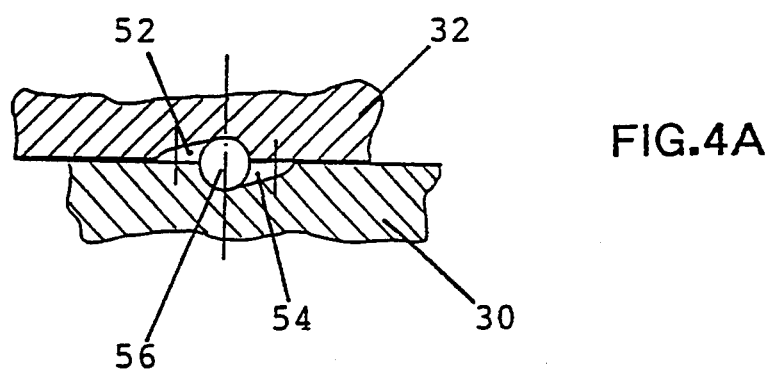
FIGS. 4A and 4B show a developed view of the ball self-closure of the gear according to FIGS. 2 and 3 in two operating positions.
Figure 4B:
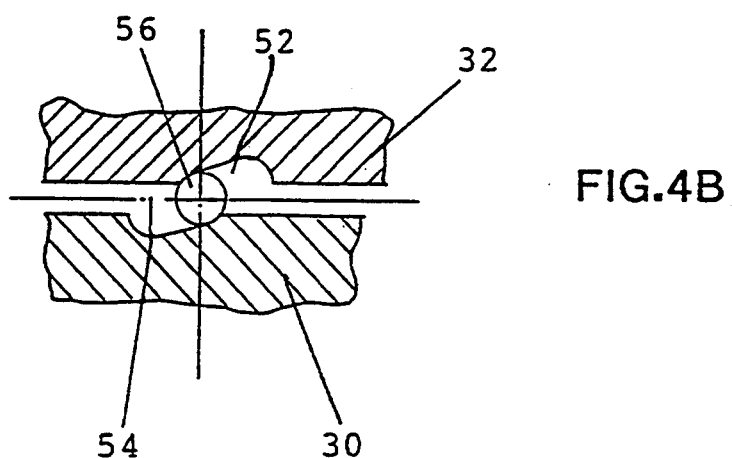
Figure 2A:
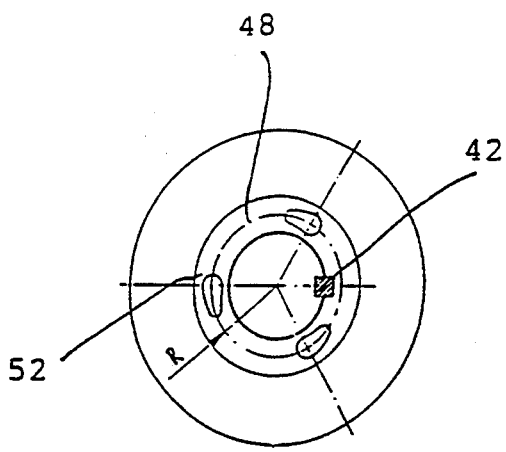
FIG. 2 shows a first embodiment of a gear, seated on the rotor drive shaft, with sectional views according to the line II—II, seen from above and below.
Figure 3:
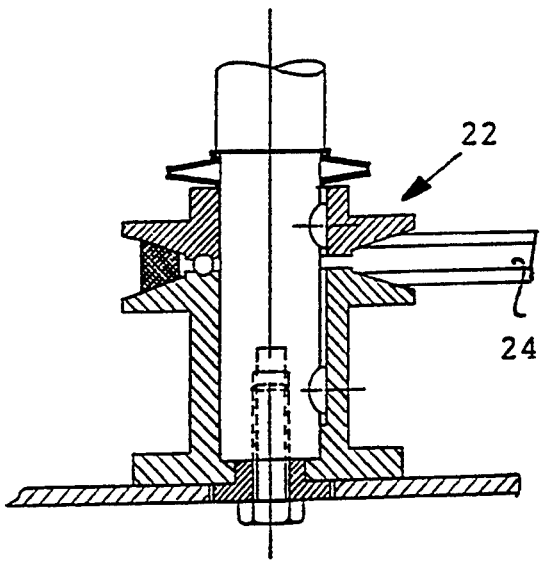
FIG. 3 shows the gear arrangement according to FIG. 2, in another operating position.
Figure 2:
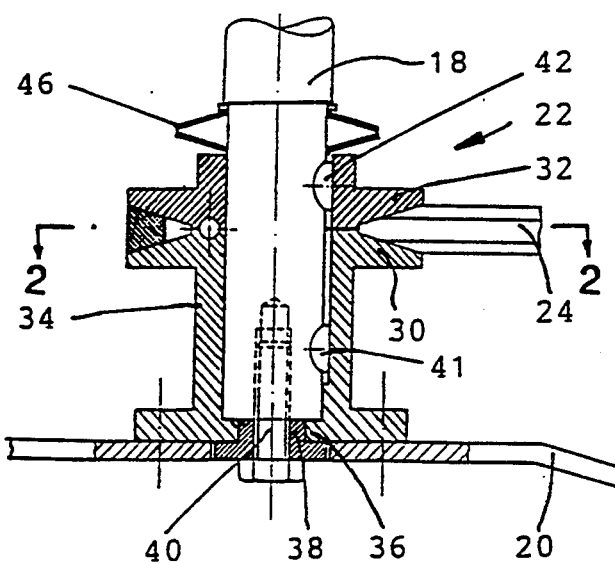
Figure 2B:
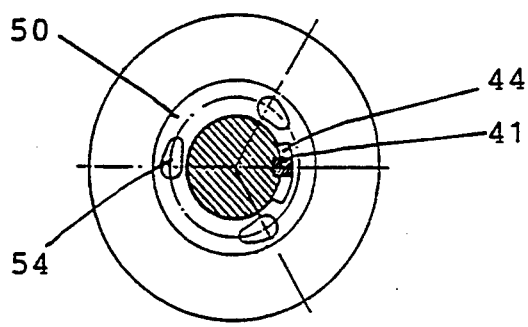
Figure 5A:
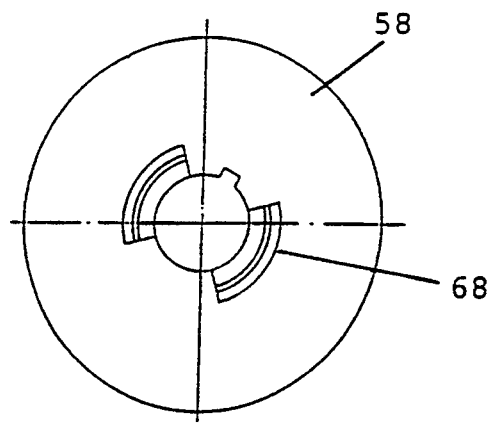
FIG. 5 shows a further embodiment of a gear seated on the rotor shaft, together with axial views.

FIGS. 2 to 4 show a first exemplary embodiment of a V-belt pulley that can be set as a function of load. The V-belt pulley 22 consists of a belt pulley half 30, which is seated on the drive shaft 18 such that it can rotate to a limited extent, and of a belt pulley half 32 which can be displaced in a rotationally secure and axial fashion on the drive shaft 18. The lower belt pulley half 30 is carried by a hub 34 which surrounds the drive shaft 18 and has a lower end flange 36 which bears against the drive shaft at the end face. The end flange 36 is supported from below by a ring 38 which is held by a screw 40 that is axially screwed into the shaft 18. Inserted into an axial groove in the shaft 18 is a feather 41, and the hub 34 has a cutout 44 that extends over its inner circumference through a predetermined angle, so that the lower belt pulley half 30 can rotate by this predetermined angle relative to the shaft 18. By contrast, the feather 42 effects a rotationally secure connection of the upper belt pulley half without play. A disk spring 46 axially supported on the drive shaft 18 acts from above on the upper, axially movable belt pulley half 32, and tends to press the latter downwards. The two belt pulley halves 30 and 32 are provided on their mutually facing annular end faces 48 and 50, respectively, with three ball races 52 and 54, respectively, which are arranged at the same angular distance from one another, rise in the circumferential direction and are represented in a developed view in FIGS. 4A and 4B. Running in these ball races 52, 54 are balls 56 which form a ball self-closure. In the idling state, that is to say when the cutter bar 20 encounters no resistance, the disk spring 46 presses the upper belt pulley half 32 onto the belt pulley half 30, with the result that their annular end faces 48 and 50 touch one another. This idling position is represented in FIG. 2 and in FIG. 4A.

With increasing load or increasing torque of the drive motor 16, the two belt pulley halves 30, 32 are rotated against one another against the action of the disk spring 46, that is to say the lower belt pulley half 30 rotates on the drive shaft 18 until in the full-load range the maximum spread position is set in accordance with FIG. 3 or in accordance with FIG. 4B. The axial displacement of the upper belt pulley half 32 effected via the balls 56 decreases the active diameter of this belt pulley 22, and as a result the drive speed of the gear 28 is reduced, and thus also the running speed of the drive wheels 14.

Figures 9, 9A:
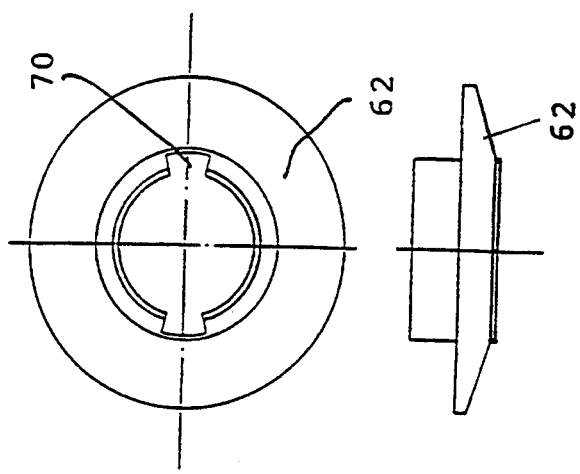
FIGS. 7 to 9 show details, drawn in elevation and plan, of the gear arrangement in accordance with FIGS. 5 and 6
Figures 8, 8A:
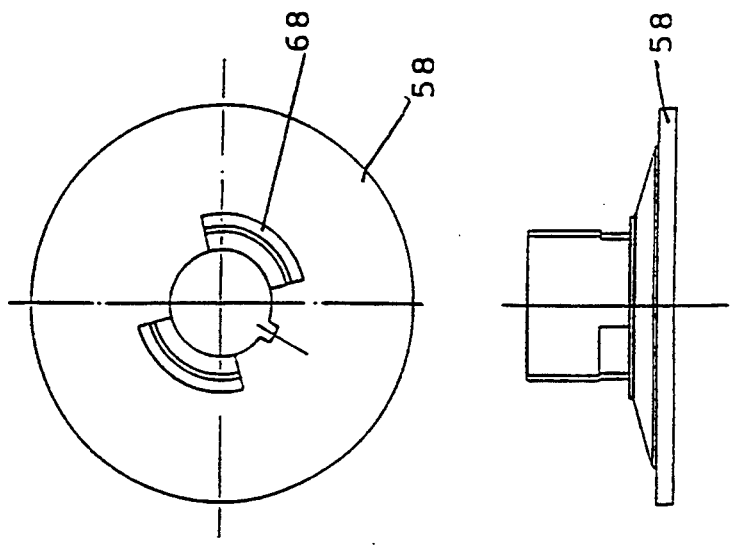
Figures 7, 7A:
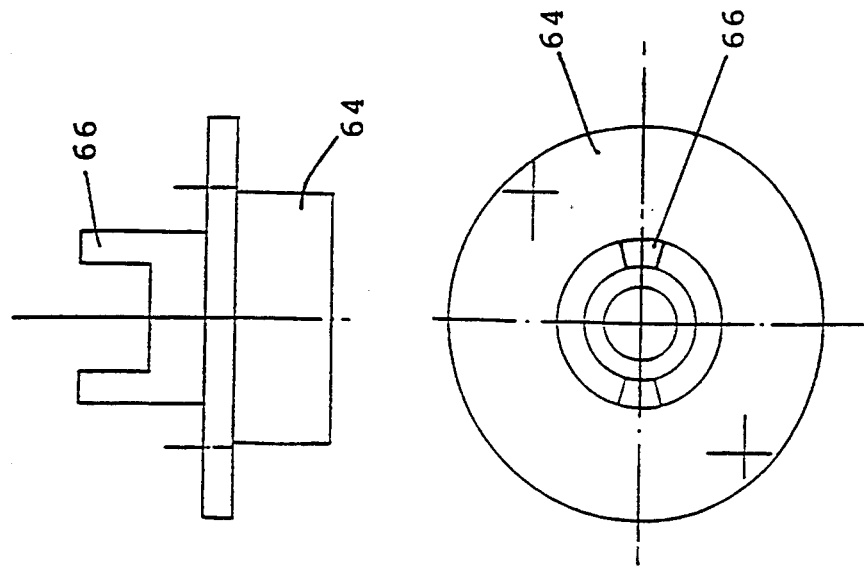

In the exemplary embodiment according to FIGS. 5 to 9, the lower belt pulley half 58 is connected to the drive shaft 18 in a manner that is both rotationally secure and axially nondisplaceable. The belt pulley half 58 has a sleeve-like hub 60 with a steep external thread. Running on this thread is an internal thread of the upper belt pulley half 62. The cutter bar 20 is screwed on a coupling piece 64 which is constructed in a sleeve-like fashion and can be rotated on the shaft 18 but is not axially displaceable with respect to the latter. The coupling piece 64 carries two guide pins 66, which project axially upwards and are guided through guide slots 68, configured in a sector-like fashion, of the lower belt pulley half 58 (cf. FIGS. 7 and 8). The ends of the guide pins 66 engage in cutouts 70 of the upper belt pulley 62 (FIG. 9).

The coupling piece 64 is coupled to the lower belt pulley 58 via tension bolt springs (72).

Figure 6:
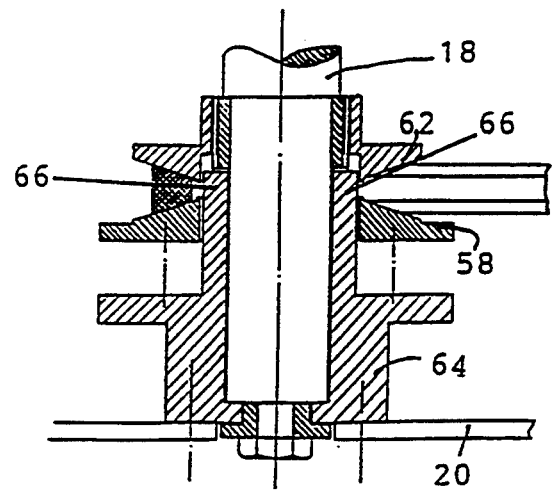
FIG. 6 shows the gear arrangement represented in FIG. 5, in another operating position.
Figure 5:
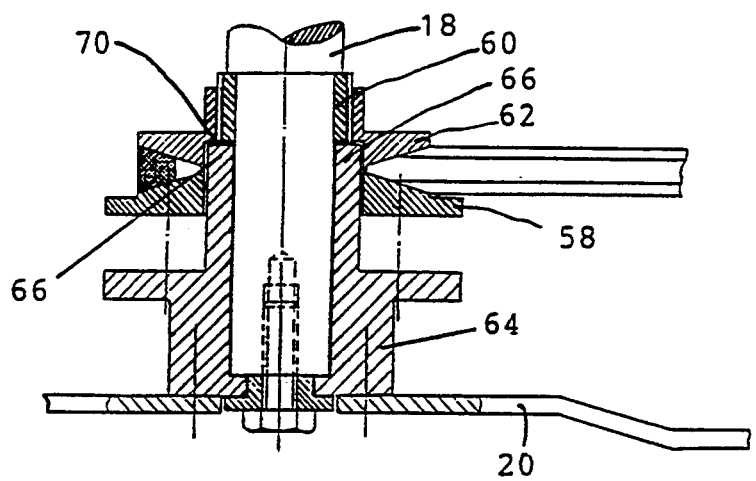
Figure 5B:
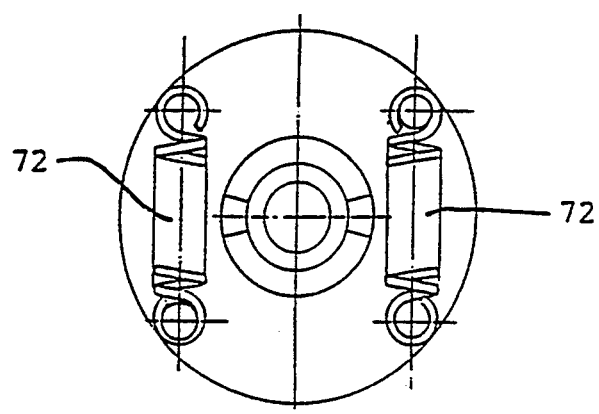

Upon rotation of the drive shaft 18, the cutter bar is taken along in idling mode via the coupling piece 64 and the springs 72, the belt pulley halves assuming the position in accordance with FIG. 5 with maximum active radius. If the cutter bar 20 encounters a resistance, the coupling sleeve 64 rotates against the force of the springs 72 relative to the drive shaft 18. In this case, as they move about the shaft 18, the guide pins 66 drive the upper V-belt pulley half 62, so that the belt pulley half 62 is lifted upwards on the thread of the hub 60 of the fixed belt pulley half 58, so that the active diameter of the belt pulley is reduced and the speed of the wheel drive is reduced. FIG. 6 shows the position in the full-load range, the guide pins bearing against the slot end, and the belt pulley halves being spread to a maximum.

Figure 10:
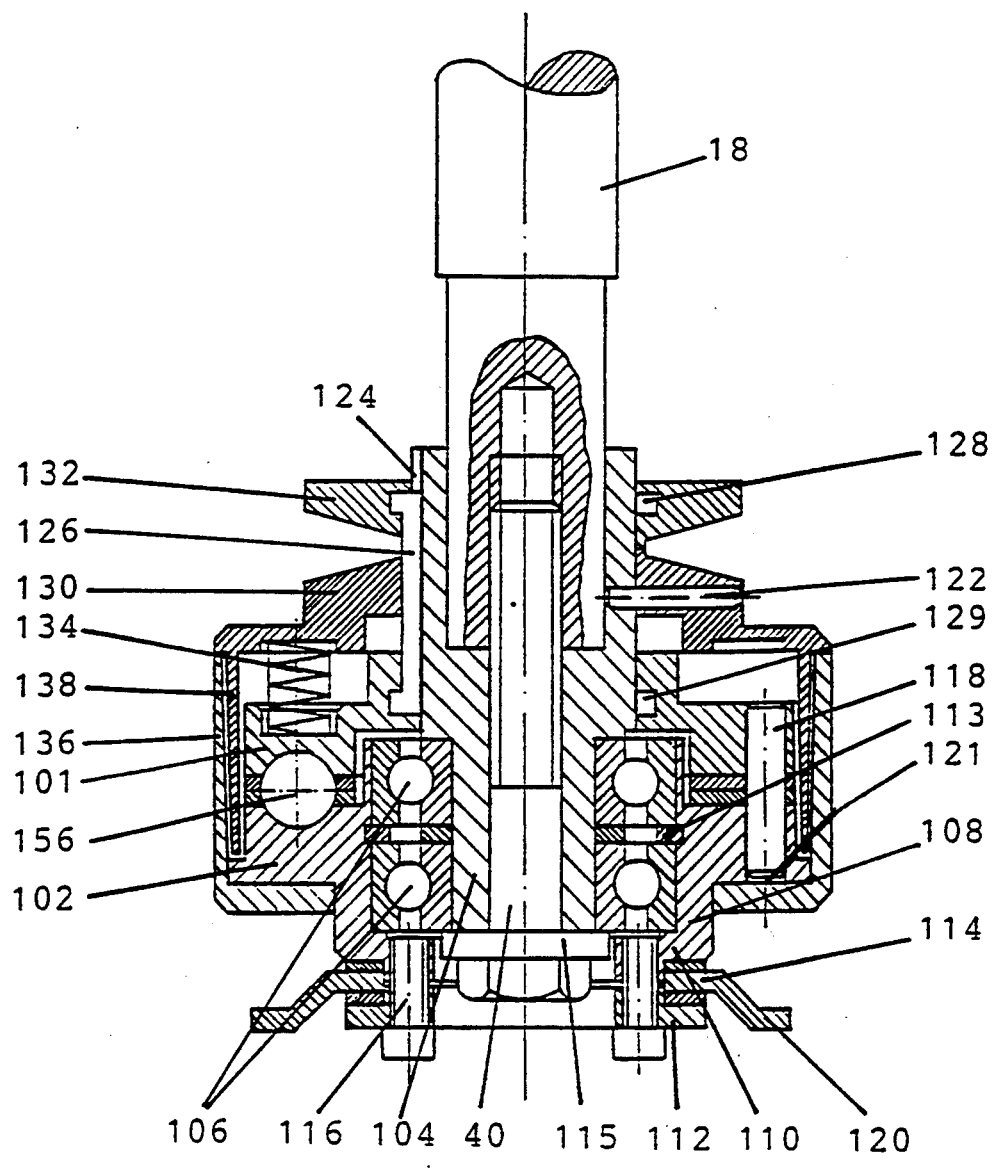
FIG. 10 shows an axial section of a further embodiment of a gear seated on the rotor drive shaft.

FIG. 10 shows a further exemplary embodiment of a gear which is seated on the rotor drive shaft and differs from the gear in accordance with FIGS. 2 to 4 in essence in that the belt pulley halves 130, 132 are assigned separate cam disks in the form of an upper spherical disk 101 and a lower spherical disk 102. The result of this is—as may be seen from the following description—that the two belt pulley halves 130 and 132 are no longer rotated against one another, but are moved relative to one another exclusively axially with respect to the variation in diameter. In this exemplary embodiment, the cutter bar 120 is not arranged fixed with the rotor shaft 18, but can be rotated to a limited extent with respect to the latter. Screwed into the rotor shaft 18 is a screw 40 which via a disk 115 strains a guide sleeve 104 on the shaft 18 in such a way that this guide sleeve 104 is connected in a rotationally secure and axially secure fashion to the rotor shaft 18. In a lower turned recess the guide sleeve carries inner ball races of two ball bearings 106 whose outer ball races are inserted in the sleeve section 108 of the lower spherical disk 102. An inwardly projecting lower annular flange 110 is supported in a self-closed fashion from below against the outer ball race of the lower ball bearing 106, and a spring ring 113 arranged between the two ball bearings projects into an internal groove of the spherical disk, with the result that the latter is fixed axially with respect to the shaft 18 but can rotate with respect to the latter.

By means of a coupling disk 112, the inner flange ring 114 of the cutter bar 120 is fixed via screws 116 on the lower flange 110 of the lower spherical disk 102.

The upper spherical disk 101 is arranged on the guide sleeve 104 in a rotationally secure but axially displaceable fashion. Balls 156 run between the two spherical disks 101 and 102 on ball races which are arranged in such a way that given a mutual rotation of the two spherical disks 101 and 102 axial spreading takes place, that is to say the ball races rise in the circumferential direction. The relative rotation of the two spherical disks is limited by stop pins 118 which are inserted in the upper spherical disk 101 and run in arcuate slots 121 of the lower spherical disk and abut on the ends thereof.

The lower belt pulley half 130 is fixed on the guide sleeve 104 in a rotationally secure and axially nondisplaceable fashion by means of pins 122. The upper belt pulley half 132 is seated in a rotationally secure fashion on the guide sleeve 104 via splining 124. The upper V-belt pulley half 132 is axially displaceable on this splining 124. This V-belt pulley 132 is axially connected in a self-closed fashion to the axially displaceable upper spherical disk 101 via pins 126 which are arranged at an angular spacing from one another and engage with their upper and lower hook ends in an inner annular groove 128 of the belt pulley half 132 and in an inner annular groove 129 of the upper spherical disk 101. Arranged distributed over the circumference between the lower belt pulley half 130, which is connected to the guide sleeve, and the axially displaceable upper spherical disk 101 are pressing screw springs 134 acting in the axial direction. The spherical disks are surrounded by a pot-like housing 136. Projecting into the latter is an annular flange 138 which extends downwards from the lower belt pulley half 130.

The interspace between the annular flange 138 and the housing 136 can be filled with fat or the like, which effects viscosity damping of the relative rotary movement.

The gear represented in FIG. 10 operates as follows:

FIG. 10 shows the idling position. If the cutter bar 120 is loaded by impinging on the grass, it tends to rotate backwards in the direction of rotation with respect to the rotor shaft 18. This has the effect that the lower spherical disk 102 is rotated with respect to the upper spherical disk 101, which is arranged in a rotationally secure fashion, with the result that the upper spherical disk 101 is lifted axially against the force of the springs 134 via the balls 156, and lifts the upper belt pulley half 132 via the driver pins 126. The effective V-belt diameter is thereby reduced, and the drive of the running wheels becomes slower. If the torque acting on the cutter bar 120 decreases, the pressure springs 134 return the upper spherical disk 101 and the upper belt pulley half 132 with the effect of increasing the speed of the drive wheels.

Figure 11:
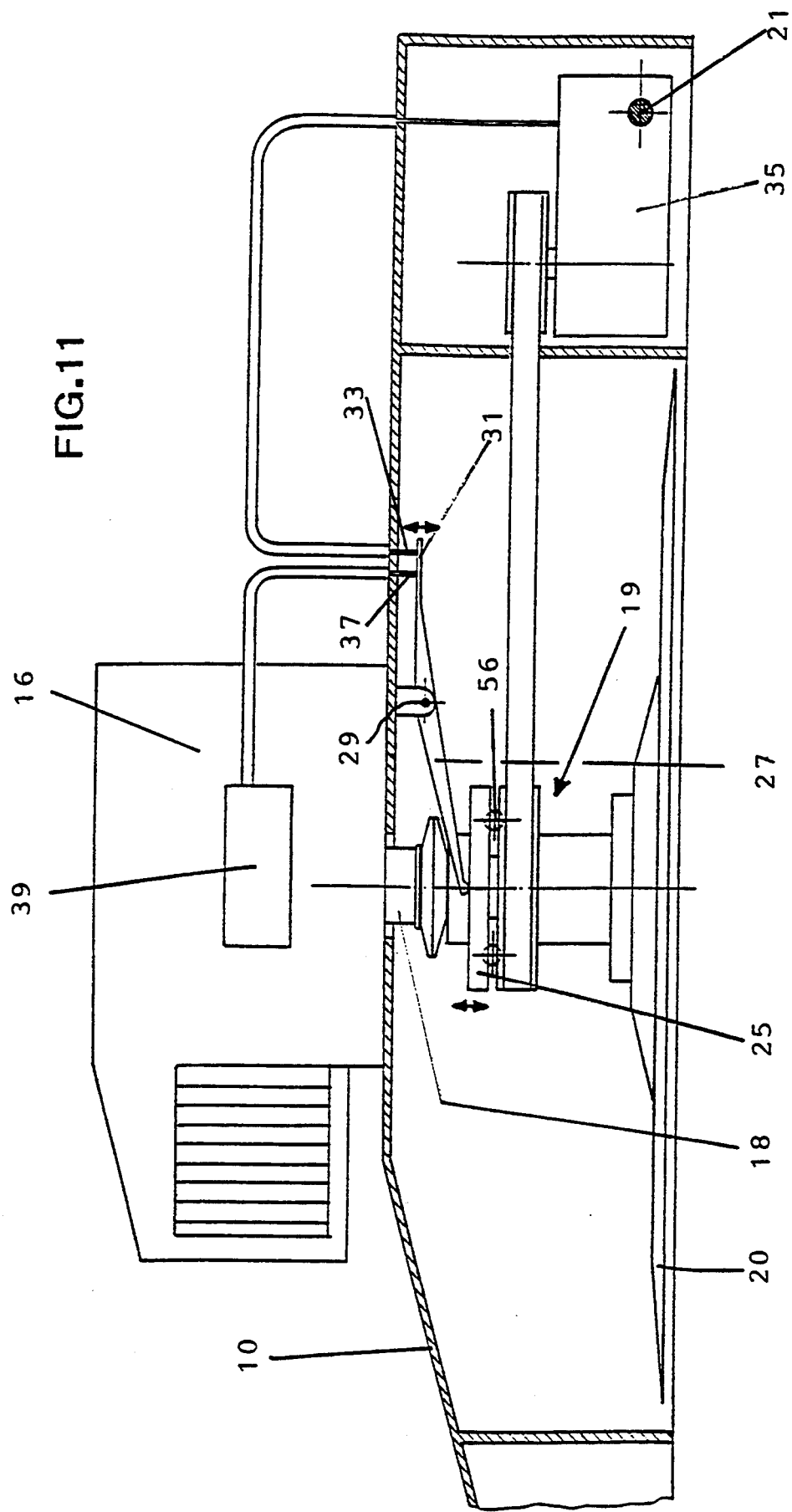
FIG. 11 shows a diagrammatic view of a lawn mower with two further possibilities for controlling the driving speed.

FIG. 11 shows a diagrammatic representation of a lawn mower having two further possibilities of setting the driving speed. The lawn mower has chassis 10, a drive motor 16, a cutter bar 20 which is driven by the motor 16 via a vertical rotor shaft 18, and a V-belt pulley gear 19 with a fixed transmission. The gear output shaft 21 carries the running wheels. Seated on the drive shaft 18 is a diagrammatically represented control disk 25, which is constructed as a spherical disk and interacts by means of balls with a lower spherical disk which, in this case, can be formed by the surface of the V-belt pulley. When the load changes, there is an axial displacement of the control disk 25. The gear arrangement, which effects this axial displacement, can be constructed in accordance with one of the above-described exemplary embodiments. For this reason, there is no need at this point to explain structural details further. All that has to be stated is that with increase in the output torque the control disk 25 is raised, and with decrease in the torque (load drop) there is a downward axial movement. Interacting with the control disk 25 is a transmission lever 27 which is constructed as a double-armed lever and is mounted pivotally about an axis 29 fixed in the chassis. The other end 31 of the transmission lever 27 effects a shifting movement. Two exemplary embodiments are combined in the drawing. In accordance with the first exemplary embodiment, there is connected to the end 31 of the transmission lever a first Bowden wire 33, which leads to a variable-speed gear 35. This variable-speed gear 35 can be a mechanical variable gear or a hydrostatic variable gear or another commercially available gear which can varied via an actuator. The arrangement is made in this case in such a way that upon pivoting the transmission lever 27 clockwise in accordance with FIG. 11 (increasing the output torque, raising the control disk 25) the gear 35 is actuated via the Bowden wire 33 to the effect of a reduction in speed. In the case of reduction in the output torque, there is an adjustment in the reverse sense.

Instead of this, or in addition, the transmission lever 27 can act with its end 31 on a further Bowden wire 37 which adjusts the controller spring 39 of the motor, and thus matches the speed level and output level to the motor load. The transmission lever 27 brushes with its left-hand end against the control disk 25 and is pivoted by the axial adjustment thereof.

Figure 12:
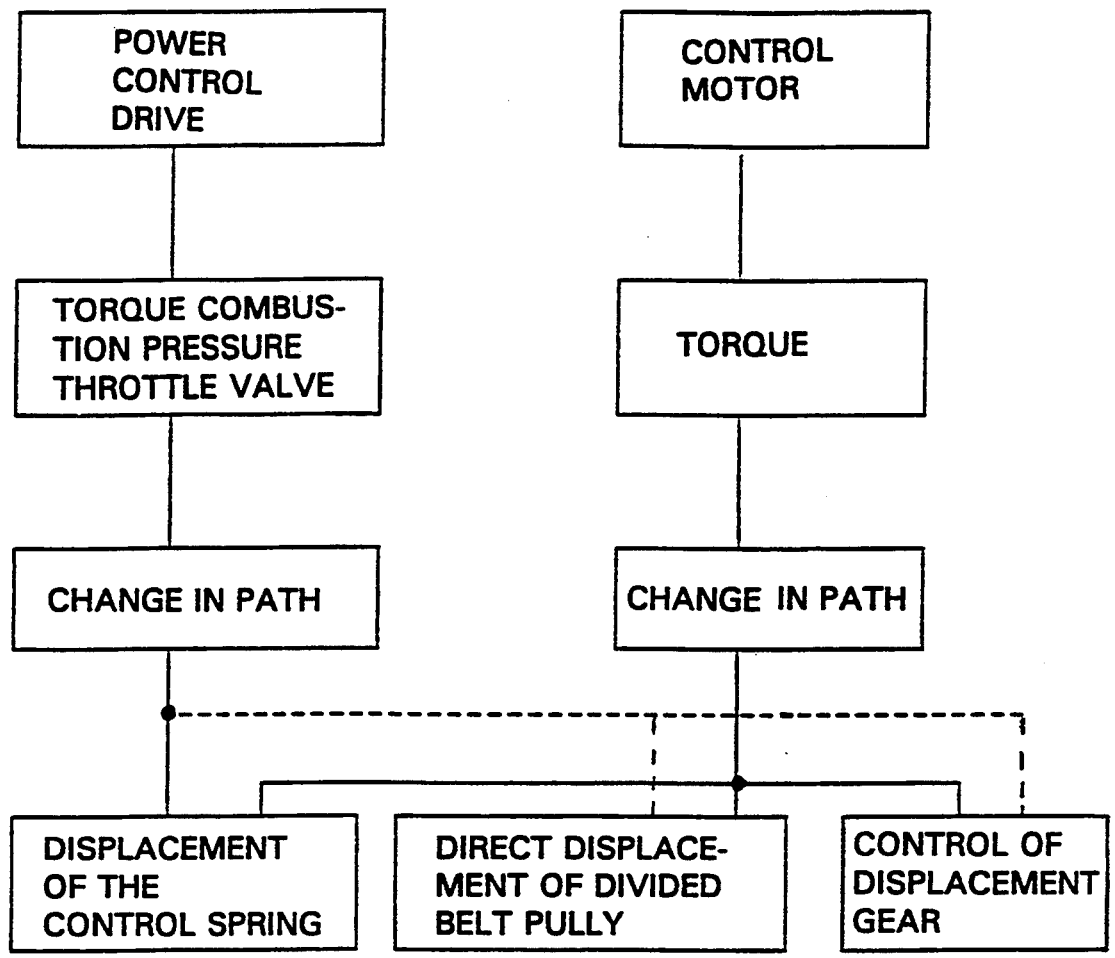
FIG. 12 shows a block diagram of the motor control/traveling drive control system.

FIG. 12 shows a block diagram which gives an idea of the motor control/traveling drive control system as realized by the present invention. It is conceivable, accordingly, to make use of the difference in travel resulting from a change in load, in particular the axial displacement of a control disk, in order to change the driving speed therewith. The traveling drive control aimed at in connection with the exemplary embodiments described can be applied in combination with a motor output control such as is described in German Offenlegungsschrift 4,201,151, that is to say it is possible to derive from the reaction torque occurring during loading of the rotor a manipulated variable by means of which the speed and/or the output and/or the torque of the drive motor is controlled or, if necessary, regulated. Such a control would correspond to the dashed line in FIG. 12.

In accordance with the exemplary embodiments described above, the gear provided was a stepless gear which effected a stepless speed setting under load-dependent control. Instead of this, the gear can also be designed as a multi-step reduction gear, in particular as a two-step gear. This simplified embodiment can be connected such that the actuator, which is prestressed against spring force, snaps into a second switching position upon overshooting of a predetermined load torque, and returns to the first switching position upon undershooting of the load. Numerous simple switching arrangements familiar to the person skilled in the art are conceivable for realizing this switching function.

We claim:

1. A mobile garden appliance including:

wheels (14) movably supporting said appliance, tools (20), a motor (16) providing power for driving said wheels and operating said tools, and a traveling drive (28) interposed between said motor and said wheels;

said appliance also including a controller for setting said traveling drive to operate said wheels at speeds that are a function of loading on said motor;

said controller having an operating characteristic which causes driving speed of said wheels to decrease as loading of said motor increases and which causes driving speed of said wheels to increase as loading of said motor decreases; and under normal operating conditions loading of said motor, as a result of operating said tools, decreases as driving speed of said wheels decreases;

said motor (16) including an output shaft (18) and said tools (20) being driven directly by the motor (16);

said controller including a gear arranged between the motor shaft (18) and the traveling drive (28);

said gear being a stepless gear constituted by a V-belt pulley gear that is of variable active diameter;

said V-belt pulley gear including first and second pulley halves (130, 132) connected to one another in a rotationally secure fashion, and the adjustment of the one pulley half (132) is performed via a spherical disk (101) which is coupled axially in a self-closed fashion to the belt pulley half (132) and is seated with the latter in a rotationally secure fashion on the drive shaft (18); and a spherical disk (102) which is rotationally secure with respect to the cutter bar (120) and rotatable with respect to the cutter drive shaft (18), said spherical disk (102) interacting with said spherical disk (101) via adjusting balls (156).

2. A garden appliance according to claim 1 in which pressing screw springs (134) are arranged between the V-belt pulley half (130) permanently connected to the output shaft (18) and the axially movable spherical disk (101) at the same angular spacing.

3. A garden appliance according to claim 1 in which a guide sleeve (104) which supports the lower spherical disk (102) via ball bearings (106) is mounted on the output shaft (18).

4. A garden appliance according to claim 1 in which the cutter bar is fixed on the lower spherical disk (102).

5. A garden appliance according to claim 1 in which one of the spherical disks (101, 102) carries one or more stop pins (118) which project axially into an arcuate slot of the opposite spherical disk and effect a rotary movement.

6. A garden appliance according to claim 1 in which the self-closed connection between the upper spherical disk (101) and the lower belt pulley half (132) is performed by means of hooked pins which are arranged at the same angular spacing, are guided in the fixed belt pulley half (130) and engage with their end hooks in a self-closed fashion in grooves (128, 129) of belt pulley half (132) or spherical disk (101).

7. A garden appliance according to claim 1 in which the controller is combined with a device for controlling the speed and/or the output and/or the torque of the drive motor (16), which is controlled or regulated in accordance with the reaction torque occurring in the stator given loading of the rotor via a manipulated variable derived herefrom.

8. A garden appliance according to claim 1 in which the interspace between an annular flange (138) of the lower belt pulley half (132) and a pot-like housing (136) is filled with a highly viscous material, for example fat, in order to effect viscosity damping of the relative rotary movement.

9. A mobile garden appliance including:

wheels (14) movably supporting said appliance, tools (20), a motor (16) providing power for driving said wheels and operating said tools, and a traveling drive (28) interposed between said motor and said wheels;

said appliance also including a controller for setting said traveling drive to operate said wheels at speeds that are a function of loading on said motor;

said controller having an operating characteristic which causes driving speed of said wheels to decrease as loading of said motor increases and which causes driving speed of said wheels to increase as loading of said motor decreases; and under normal operating conditions loading of said motor, as a result of operating said tools, decreases as driving speed of said wheels decreases;

said motor (16) including an output shaft (18) and said tools (20) being driven directly by the motor (16);

said controller including a gear arranged between the motor shaft (18) and the traveling drive (28);

said gear being a stepless gear constituted by a V-belt pulley gear that is of variable active diameter;

said V-belt pulley gear including first and second pulley halves, one of the V-belt pulley halves (32; 58) being mounted in a rotationally secure fashion, and the other of the V-belt pulley halves (30; 62) being rotatable to a limited extent on the motor drive shaft (18) to achieve a load-dependent relative rotation of the V-belt pulley halves that acts against a spring (46; 72) effecting a change in diameter;

said V-belt pulley halves having mutually facing annular end faces, and a ball self-closure (52, 54, 56) disposed between the annular end faces for spreading the pulleys upon relative rotation; and said mutually facing annular end faces (48, 50) of the belt pulley halves having ball races (52, 54) which rise in the circumferential direction and accommodate running balls (56).

10. A garden appliance according to claim 9, in which a disk spring (46) is applied axially to the belt pulley half (32) which can move axially with respect to the belt pulley half (30) and is seated on the shaft (18) in a rotationally secure fashion.

* * * * *